US010495361B2

(12) United States Patent
Max

(10) Patent No.: US 10,495,361 B2
(45) Date of Patent: Dec. 3, 2019

(54) MULTIPLE PANEL HEAT EXCHANGER

(71) Applicant: MaxSystems, LLC, Washington, DC (US)

(72) Inventor: Michael D. Max, Washington, DC (US)

(73) Assignee: MAXSYSTEMS, LLC, Washington, DC (US)

( * ) Notice: Subject to any disclaimer, the term of this patent is extended or adjusted under 35 U.S.C. 154(b) by 149 days.

(21) Appl. No.: 15/796,918

(22) Filed: Oct. 30, 2017

(65) Prior Publication Data

US 2018/0066877 A1  Mar. 8, 2018

Related U.S. Application Data

(63) Continuation-in-part of application No. 13/480,021, filed on May 24, 2012, now abandoned.

(51) Int. Cl.
*F25B 39/02* (2006.01)
*E03B 3/28* (2006.01)
(Continued)

(52) U.S. Cl.
CPC .......... *F25B 39/024* (2013.01); *B01D 5/0015* (2013.01); *E03B 3/28* (2013.01); *F24F 3/14* (2013.01); *F24F 11/83* (2018.01); *F25B 5/04* (2013.01); *F25B 39/02* (2013.01); *F28D 1/05333* (2013.01); *F28D 1/05383* (2013.01); *F24F 11/84* (2018.01); *F24F 2003/1446* (2013.01); *F28D 2021/0038* (2013.01); *F28D 2021/0071* (2013.01); *Y02A 20/109* (2018.01)

(58) Field of Classification Search
CPC ... B01D 5/0015; F25B 39/02; F28D 1/05383; F28D 2021/0071; F28D 2021/0038; F24F 13/222; F24F 3/1405; F24F 2003/1446; F24F 11/0015; F25D 21/14
See application file for complete search history.

(56) References Cited

U.S. PATENT DOCUMENTS 2,146,483 A * 2/1939 Philipp ................. F24F 3/1405
                                                         236/44 R
2,455,850 A   12/1948 Atchinson
(Continued)

FOREIGN PATENT DOCUMENTS

JP          3993617 B2 * 10/2007

*Primary Examiner* — Henry T Crenshaw
*Assistant Examiner* — Kamran Tavakoldavani
(74) *Attorney, Agent, or Firm* — Potomac Law Group, PLLC; Kenneth Fagin

(57) ABSTRACT

The multiple panel heat exchanger includes two or more heat exchange panels arranged side-by-side series with their major cross-sectional areas normal to airflow across the heat exchanger. The heat exchange panels are fluidically connected in series and with a first heat exchange panel in the series having a heat exchange fluid inlet into the heat exchanger and a last heat exchange panel in the series having a heat exchange fluid outlet from the heat exchanger. An inlet liquid refrigerant injector and vaporizer has a valve that can control the rate of injection and can close completely. The panels are connected by a pipe assembly containing another valve that can also control the rate of gas refrigerant passage and which can also be closed.

11 Claims, 6 Drawing Sheets

(51) Int. Cl.
  *F24F 3/14*  (2006.01)
  *F25B 5/04*  (2006.01)
  *F24F 11/83*  (2018.01)
  *B01D 5/00*  (2006.01)
  *F28D 1/053*  (2006.01)
  *F24F 11/84*  (2018.01)
  *F28D 21/00*  (2006.01)

(56) References Cited

U.S. PATENT DOCUMENTS

| | | |
|---|---|---|
| 4,691,527 A | 9/1987 | Ikeda |
| 5,076,353 A | 12/1991 | Haussmann |
| 5,176,200 A | 1/1993 | Shinmura |
| 5,529,116 A * | 6/1996 | Sasaki ............... F28D 1/0417 123/41.51 |
| 6,170,271 B1 | 1/2001 | Sullivan |
| 6,189,335 B1 | 2/2001 | Ebara et al. |
| 6,415,619 B1 | 7/2002 | Bash et al. |
| 6,490,877 B2 | 12/2002 | Bash et al. |
| 6,828,499 B2 | 12/2004 | Max |
| 6,945,063 B2 | 9/2005 | Max |
| 7,086,239 B2 | 8/2006 | Haas et al. |
| 7,254,961 B2 | 8/2007 | Oshitani et al. |
| 7,293,420 B2 | 11/2007 | Max |
| 7,373,787 B2 | 5/2008 | Forsberg et al. |
| 7,726,150 B2 | 6/2010 | Nishijima et al. |
| 7,757,514 B2 | 7/2010 | Oshitani et al. |
| 7,895,854 B2 | 3/2011 | Bash et al. |
| 2003/0066633 A1 | 4/2003 | Lee et al. |
| 2004/0244398 A1 | 12/2004 | Radermacher et al. |
| 2006/0101838 A1 | 5/2006 | Ritchey |
| 2007/0079624 A1 | 4/2007 | Max |
| 2008/0029764 A1 | 2/2008 | Taras et al. |
| 2008/0314062 A1 | 12/2008 | Ritchey |
| 2009/0241580 A1 | 10/2009 | Hill et al. |
| 2009/0321435 A1 | 12/2009 | Max |
| 2010/0083674 A1 | 4/2010 | Merritt |
| 2010/0242505 A1 | 9/2010 | Thybo et al. |
| 2011/0303401 A1* | 12/2011 | Kamoshida ........... F25B 39/022 165/173 |

* cited by examiner

MULTIPLE PANEL HEAT EXCHANGER

CROSS-REFERENCE TO RELATED APPLICATIONS

This application is a continuation-in-part of application Ser. No. 13/480,021, filed May 24, 2012.

FIELD OF THE INVENTION

The present invention generally relates to heat exchangers and improvements in heat exchanger performance. In particular, and in a representatively illustrated embodiment, the present invention relates to a specially designed heat exchanger operative to generally remove sensible heat before removing latent heat from a single direction air flow across the heat exchanger. Although the invention has potential for other uses, a preferred use is for the energy efficient condensation of water from moist air.

BACKGROUND OF THE INVENTION

Heat exchange for the purpose of cooling air applies to many purposes, including air conditioning, space refrigeration, and dehumidification. A vapor-compression refrigeration system is conventionally used for these and other air cooling purposes. Vapor-compression refrigeration systems are well known, and are a principal technology used for condensing water from air, such as, for example in an atmospheric water harvesting unit. A typical vapor-compression refrigeration circuit includes a compressor, a condenser, an expansion valve, and an evaporator connected in series by a refrigerant piping. During operation, the compressor forces refrigerant from its outlet through the piping circuit sequentially through the condenser, the expansion valve, the evaporator, and back into the inlet of the compressor. Cold refrigerant is passed through the evaporator which cools air flowing across the evaporator by absorbing heat from the air as it passed across the evaporator.

The heat exchange between the cold refrigerant flowing in the evaporator and the air flowing across the evaporator is used in atmospheric water harvesting to extract water from the air by condensing water vapor dissolved in the air. The general principals and attributes of atmospheric water harvesting are well understood in the art. An exemplary atmospheric water harvesting device is disclosed in U.S. Pat. No. 7,954,335, the entirety of which is incorporated herein by reference.

While atmospheric water harvesting is understood in the art, a brief discussion of the general principals is with worth having herein. Generally, to condense water from air, a high surface area heat exchanger, such as the evaporator in a vapor-compression refrigeration system, is maintained at a temperature below the dew point of the air that is incident upon it. The moist air is passed through or over the chilled surfaces of the heat exchanger which further lowers the temperature of the air and condenses the water vapor dissolved in the air. The condensed water falls, by gravity, and is collected for use. Water condensation is well known as a byproduct of chilling air for other purposes, but water produced as a byproduct of chilling air for reasons other than water production is generally unsafe for drinking.

Atmospheric water harvesting generally produces high quality potable water from the air in the general vicinity of its place of use is pure and safe for immediate drinking with very little additional treatment required. Producing potable water near its place of use removes the requirement for either temporary or fixed water delivery systems such as pipelines or bulk water tankers or bottled water. Production of high-quality water at or near its place of use saves the energy that would otherwise be used for transport or to fabricate and maintain a water transport system. In addition, water harvesting produces virtually no waste products. Water harvesters are environmentally beneficial, especially on islands or in remote locations because building and maintenance of water delivery systems are not required and the waste attributed to used water bottles is not an issue. The water may be stored and treated against bacterial and other contamination using relatively inexpensive, simple systems because it is essentially pure, distilled water to begin with.

When significantly chilling air or removing a maximum amount of water from air through condensation, energy efficiency is usually low. The energy efficiency of an atmospheric water harvesting unit is based on many factors, including, but not limited to the refrigeration capacity of the vapor-compression refrigeration system, the relativity humidity of the air from which water is being harvested, and the evaporator construction.

Condensation on the evaporator takes place by reducing the temperature of the humid air to the point at which it is depressed below dew point. Where intake air is at a high humidity, for instance in excess of 85% relative humidity (RH), water will begin to condense with relatively little energy consumed by chilling of the air itself. The delivery of air to the evaporator at approximately 90+% RH is the primary objective for the most economic water production through condensation. The sensible heat of the humid air, which is the term applied to heat associated with temperature change, first must be removed to lower the temperature of the air in order to bring the air to as near 100% RH as possible, at which point the air is supersaturated and further cooling initiates condensation. As the temperature of the humid air falls further, condensation proceeds as the latent heat, which is that required to cause the water vapor to condense to liquid water, is removed by heat exchange. Following the initiation of condensation, water is produced and can be extracted by removing both sensible heat and latent heat from the humid air, which remains at supersaturation as it cools further.

In order to achieve optimum energy efficiency, it is desirable to minimize the degree of sensible heat removal to increase the refrigeration potential that is available for latent heat removal. In other words, it is desirable to increase the latent heat to sensible heat removal ratio. If the evaporator is operated at very low temperatures, there is a higher energy cost because increasing sensible heat must be removed along with latent heat. The refrigerant compressor is the primary energy cost in a vapor compression refrigeration system. Although very high chilling potential has the potential to remove proportionally more water from the air, as would be desirable in a dehumidifier in which drying the air is the objective, as temperature is decreased the energy cost per volume of water is increased. It has been found that it is more energy efficient to move higher volumes of air and remove only a relatively small amount from it at lower chilling potential than to greatly chill the evaporator. Some combination of minimum chilling potential and airflow will produce the maximum energy efficiency as it reduces load on the compressor.

SUMMARY OF THE INVENTION

Embodiments of the present invention addresses these needs by providing an evaporator or heat exchanger apparatus that is operative to first remove sensible heat from the air using a variable degraded chilling potential to reserve chilling potential for the removal of latent heat during condensation. Chilling potential may be additionally controlled by varying airflow volume.

Embodiments of the present invention also provide a vapor-compression refrigeration system evaporate including multiple interconnected panels in a single evaporator unit that are arranged generally parallel and in-line so that airflow passes through each panel without deviating from a net airflow direction. In this arrangement, the chilling potential of each panel may be variably controlled to achieve a desired operational efficiency.

Embodiments of the present invention also provide an arrangement of the interconnected panels such that the upstream panel relative to air flowing across the evaporator is a downstream panel relative to flow of refrigerant through the evaporator.

Embodiments of the present invention also provide an atmospheric water harvesting unit including embodiments of the specially designed vapor-compression system evaporate of the present invention.

Embodiments of the present invention also provide an apparatus that simplifies prior processes proposed for pre-cooling, multiple air paths, and/or multiple heat exchanger apparatus to achieve better control of the temperature of air within an atmospheric water harvester.

Embodiments of the present invention are versatile and scalable—that is, the evaporator may be provided in many sizes and may be used in an apparatus that may be portable or fixed in with respect to geographic position or the place or mode of its use.

To achieve these and other advantages, in general, in one aspect, a heat exchanger is provided. The heat exchanger includes at least two heat exchange panels, each heat exchange panel having a major cross-sectional area about normal to an airflow across the heat exchange panel. Each of the at least two heat exchange panels are arranged in series with their major cross-sectional areas parallel and overlapping. A first valve is fluidically connected to a heat exchange fluid inlet of a first heat exchange panel in the series, and is operative to control a flow of heat exchange fluid into the first heat exchange panel. A second valve fluidically connects a heat exchange fluid outlet of the first heat exchange panel and a heat exchange fluid inlet of a second heat exchange panel in the series, and is operative to control a flow of heat exchange fluid between the at least two heat exchange panels. The first heat exchange panel is upstream of the second heat exchange panel in relation to heat exchange flow, and the first heat exchange panel is downstream of the second heat exchange panel in relation to the airflow across the first and second heat exchange panels.

In general, in another aspect, the heat exchanger may be connected to a vapor-compression refrigeration circuit such that the first heat exchange panel is arranged upstream from the last heat exchange panel in relation to the direction of refrigerate flow in the vapor-compression refrigeration circuit.

In general, in another aspect, the last heat exchange panel may have a major cross-sectional area that is less than the major cross-section area of the first heat exchange panel.

In general, in yet another aspect, an atmospheric water harvester is provided. The atmospheric water harvester has a refrigeration circuit including an evaporator that is positioned in single direction airflow through the atmospheric water harvester. The evaporator includes at least two heat exchange panels, each heat exchange panel having a major cross-sectional area about normal to an airflow across the heat exchange panel. Each of the at least two heat exchange panels are arranged in series with their major cross-sectional areas parallel and overlapping. A first valve is fluidically connected to a heat exchange fluid inlet of a first heat exchange panel in the series, and is operative to control a flow of heat exchange fluid into the first heat exchange panel. A second valve fluidically connects a heat exchange fluid outlet of the first heat exchange panel and a heat exchange fluid inlet of a second heat exchange panel in the series, and is operative to control a flow of heat exchange fluid between the at least two heat exchange panels. The first heat exchange panel is upstream of the second heat exchange panel in relation to heat exchange flow, and the first heat exchange panel is downstream of the second heat exchange panel in relation to the airflow across the first and second heat exchange panels.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF EMBODIMENTS OF THE INVENTION

As a preliminary matter, it should be noted that in this document (including the claims) directional terms, such as "above", "below", "upper", "lower", etc., are used for convenience in referring to the accompanying drawings. Additionally, it is to be understood that the various embodiments of the invention described herein may be utilized in various orientations, such as inclined, inverted, horizontal, vertical, etc., without departing from the principles of the invention.

Additionally, while the description of evaporator embodiments of the present invention made herein are particularly related to utilization in atmospheric water harvesting, one of ordinary skill in the art will readily appreciate embodiments of the of the present invention may be utilized in other systems requiring a heat exchange, and the invention should not be limited solely in connection with atmospheric water harvesting.

Figure 1:
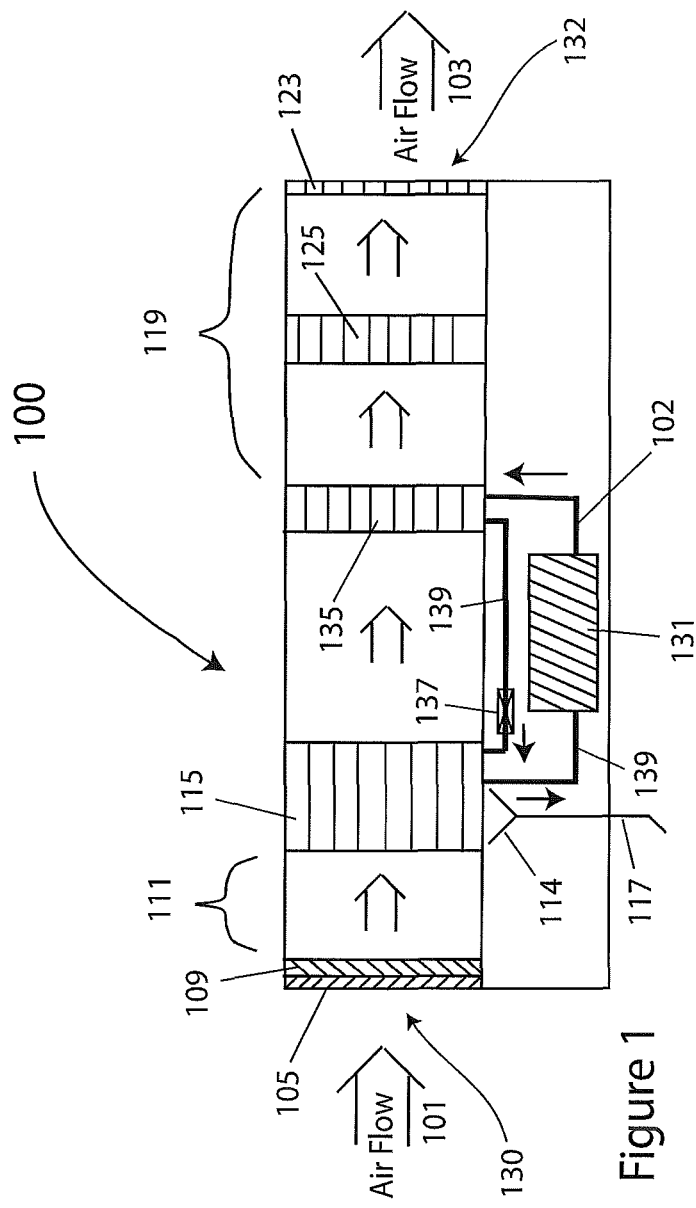
FIG. 1 is schematic diagram of a representative vapor compression condensation atmospheric water harvester in accordance with an embodiment of the present invention.

Turning first to FIG. 1, an atmospheric water harvester representatively embodying principles of the present invention is generally designated by the reference number 100, and illustratively includes a refrigerant circuit 102.

The atmospheric water harvester 100 operates to draw in ambient air 101 through an intake 130, condense water vapor from the ambient air for collection, and then exhaust dehumidified air 103 through an exhaust 132. The intake 130 and the exhaust 132 are generally disposed on opposite ends of the harvester, and at a sufficient separation in order to minimize the intake of exhaust air 103. The harvester 100 may be placed out-of-doors, where it is surrounded by moist air or placed within an enclosure, a building, a boat, ship, motor vehicle or any other vehicle such as a train in such a way that moist outdoor ambient air can be ducted to it and the dehumidified air exhausted.

Condensing of the water vapor for collection is facilitated by the refrigerant circuit 102, which representatively is a vapor-compression refrigeration circuit including a compressor 131, a condenser 135, an expansion valve 137, and an evaporator 115 connected in series by refrigerant piping 139 (heavy lines). During operation, the compressor 131 forces refrigerant from its outlet through the refrigerant piping 139 sequentially through the condenser 135, the expansion valve 137, the evaporator 115, and back into the inlet of the compressor. Cold refrigerant is passed through the evaporator 115 which cools air flowing across the evaporator by absorbing heat from the air as it passed across the evaporator, which causes water vapor to condense from the air for collection, as will be further explained below.

In operation of the harvester 100, ambient air 101 is drawn into the harvester 100 through intake 130 under suction and then expelled as exhaust air 103 under pressure through exhaust 132 by an impeller/fan 125. A preferred location for the impeller 125 is downstream from the compressor 135, although it could also be located elsewhere in the airflow path. More specifically, ambient humid air 101 enters the harvester 100 through the intake 130 at which one or more grates, screens, and replaceable air filters 105 reside in a housing 109 that allows easy replacement of filters. Other pre-filters may also be employed. Air 101 then passes through an upstream air passage 111, and across the evaporator/heat exchanger 115 within which the condensation takes place. Water produced from the condensation drips to the lower part of the evaporator 115 and is collected from beneath by a collector tray 114 and drain 117. After flowing across the evaporator/heat exchanger 115, air then passes through a downstream air passage 119, across the condenser 135, and then exhausted through exhaust 132.

The condenser 135 is commonly placed in the downstream airflow 119 but may also be placed wholly or partly in a separate airflow system or there may be more than one condenser/heat exchanger used. Exhaust 132 is fitted with grillwork and/or screen 123 to stop insect or larger animal infestation. The impellor/fan 125 is arbitrarily shown here in the upstream section 111 but it can also be in the downstream section 119 after the evaporator. Additionally, more than one impeller/fan can be used in either or both airway sections. Further, both the intake 130 and the exhaust 132 may have a variety of weather protection shrouds.

Figure 2:
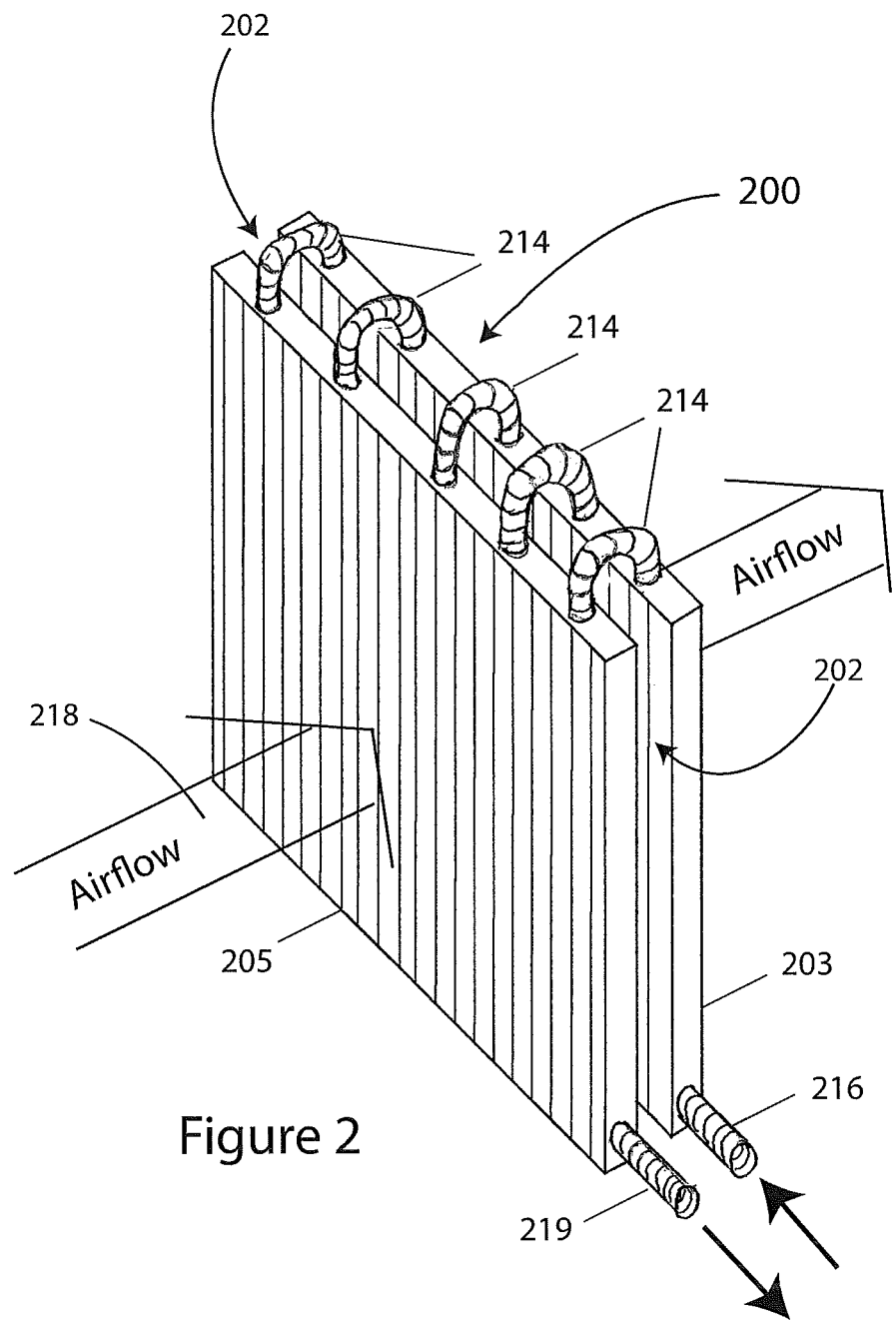
FIG. 2 is a perspective view of an evaporator having heat exchanger sections of approximately equal cross sections in accordance with an embodiment of the present invention.

Turning now to FIG. 2, there is illustrated a diagrammatic perspective view of an evaporator constructed in accordance with the principals of the present invention, and embodied as evaporator 115 in the harvester 110 illustrated in FIG. 1 and discussed above. Evaporator 200 includes multiple interconnected panels 203 and 205 in a single evaporator unit that are arranged with their major cross-sectional areas parallel and in-line with the direction the airflow 218 such that the airflow passes through each panel without deviating from a net airflow direction. Panels 203 and 205 are spaced from each other in the direction of airflow 218 to provide a gap 202 between the panels. Air within gap 202 is maintained at a temperature lower than the temperature of the incoming ambient air, and increases cooling efficiency of the downstream panel 203.

Only two evaporator panels 203 and 205 are shown for the purpose of simplicity, but more than two could be used. Panels 203 and 205 are connected together by tubes 214 and to the refrigeration circuit by tubes 216 and 219, respectively. Refrigerant flow through the evaporator 200 begins by entering panel 203 from refrigerant tube section 216, flowing through tubes 214 into panel 205 and then exiting panel 205 through refrigerant tube section 219. For the purpose of discussion herein, upstream and downstream relate to the direction of refrigerant flow through the evaporator 200.

The flow of refrigerant into and out of evaporator 200 may be individually controlled by restrictor valves (not shown) so that the rate of injection and exhaust from the evaporator can be controlled. Inlet 216 and outlet 219 are shown on the same side of evaporator for clarity but could also be on opposite sides of the evaporator to allow for the longest path for the gaseous refrigerant, as this would provide for the maximum refrigeration effect.

The panels 203 and 205 of evaporator 200 are, representatively illustrated, as a single tube and fin assembly. Different means for conveying refrigerant from one panel to the successive panel, such as a manifold or a monolithic heat exchanger, may be employed. The tubes carrying the refrigerant provide about 180 degree of turning, by tubes 214, of the refrigerant flow system between the upstream and downstream evaporator panels 203 and 205. Placing the tube 214 or connector manifold (not shown) at the top of the two evaporator panels 203 and 205 insures that water production at the base of each panel will not be affected, although they could as well be along either of the sides. Placing the turning section (tubes 214) at the top would, in a standard tube and fin configuration, put the fins in the horizontal position (although they individually may be tilted to enhance water runoff). Placing the turning section (tubes 214) along a side of the panel would result in a more vertical position for the fins, which might be able to have the effect of producing better water production.

Tubes 214 may be bent in a section having no fins or previously fabricated bends may be brazed or otherwise securely affixed so as connect the tubes of the upstream and downstream panels of the heat exchanger in a leak proof manner. The tubes in a tube and fin assembly that are not directly cooling fin assemblies are insulated and isolated from the airflow.

In operation, airflow 218 first encounters the downstream panel 205 of the evaporator 200 before encountering the upstream panel 203. This configuration allows the airflow 218 to make multiple passes across evaporator 200 by flowing through panels 205 and 203 without reorientation. In contrast, in a single pass evaporator system, air only passes through the evaporator once, and in multiple-pass evaporator system the air flow is caused to change direction a number of times.

The single direction airflow through the downstream panel 205 and then through the upstream panel 203 reduces airflow turbulence, and thus energy loss. This has the effect of reducing operational load on the fan or impeller and consequently its electricity consumption for a given volumetric air flow rate.

As discussed above, in order to achieve optimum energy efficiency, it is desirable to minimizing the degree of sensible heat removal to increase the refrigeration potential that is available for latent heat removal. The benefit of the a multi-section, multi-pass evaporator 200 is the removal of some sensible heat from the air flow by panel 205 prior to the removal of latent heat from the air flow by panel 203. The temperature of the air between any two panels of the heat exchanger is lower than the intake air and the air between other panels upstream in the airflow. Additionally the air leaving the evaporator 200 is colder than it would be if it were to pass through a heat exchanger having the same evaporator thickness, given the same refrigeration potential and airflow.

In other words, because the two panels 203 and 205 constitute one long evaporator 200, the refrigerant in the downstream panel 205 will be warmer than that in the upstream panel 203, as it will already have undergone some heat exchange with the traversing air in the upstream panel. Thus, the chilling potential of the downstream panel 205 will be lower, but it can still usefully chill the air even though no condensation may take part on the panel. This chilling constitutes pre-cooling. Water collection, however, must take into account the possibility that condensation will take place on both the upstream and downstream panels 203 and 205 so that no condensed water will be lost in humid air. It is relatively easy to condense moisture from ambient air that has high RH. At those times when the inlet air may have RH in excess of 95%, pre-cooling the air before it passes across the evaporator is unnecessary. In this case, water will be condensed on both panels and energy efficiency, as a function of water production will be at a maximum.

However, when RH is lower than is ideal for immediate condensation with a relatively small temperature drop, it is beneficial to be able to remove sensible heat before the air reaches the panel on which condensation is intended to take place so that the cooling potential of the panel continues to remove a minimum of sensible heat and a maximum of latent heat. This has the effect of improving the energy efficiency of water production by using the chilling potential in stages.

Evaporator 200 accomplishes precooling in the downstream panel 205 so that the temperature of the air encountering the upstream panel 203 has to be lowered much less than if it were the sole heat exchange panel in the airflow. Ideally, even at RH that is relatively low and for which pre-cooling is necessary to achieve energy efficiency, the downstream panel 205 will cool the air so that most of the sensible heat is removed on it. If only a relatively small amount of sensible heat is required to be removed, the downstream panel 203 may have a smaller cross sectional area, as will be discussed below and in reference to FIG. 4.

Due to the construction and operation of evaporator 200, the cross sectional areas of the evaporator panels 203, 205 can be as much as about half that of a single heat exchanger of the same refrigerating capacity. Because the heat exchanger is critical to the design of the water harvester as a whole, a water harvester using a multiple pass heat exchanger can have a smaller cross section, with saving in frame and ducting materials. This also allows the harvester to be fitted into a smaller space, such as on a small vessel where space is at a premium.

Figure 3:
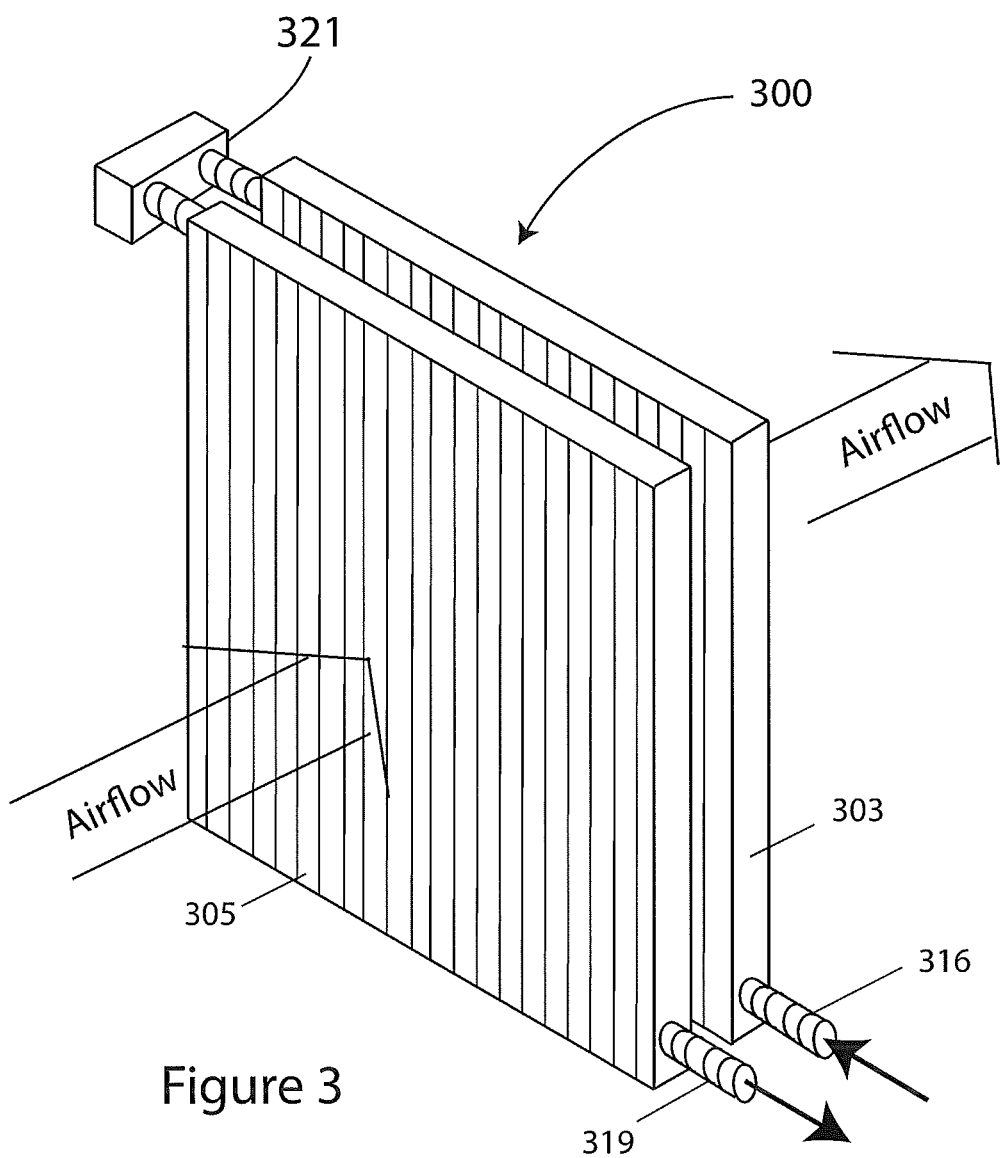
FIG. 3 is a perspective view of an evaporator having heat exchange panels fluidically connected by a restrictor or valve in accordance with an embodiment of the present invention.

Turning now to FIG. 3, there is illustrated a diagrammatic perspective view of an alternative evaporator embodiment 300 of evaporator 200. In evaporator 300, the upstream panel 303 is connected to the downstream panel 305 by a valve 321 that is operable to restrict refrigerant flow between the panels. Despite panels 303 and 305 being connected by valve 321, evaporator 300 is still a considered to be a single unit because the valve must not be entirely closed for operation of the vapor-compression refrigeration system. As in evaporator 200, evaporator 300 is illustrated having only two interconnected panels for the purpose of simplicity. Refrigerant inlet 316, refrigerant outlet 319, and the valve connection 321 are placed so as to promote the greatest traverse by the gaseous refrigerant of the interiors of the panels to maximize the chilling potential.

Operation of valve 321 to restrict refrigerant flow rate between panels 305 and 303 can result in a temperature differential between the upstream 303 and the downstream 305 panels that can altered and increased or decreased at will. This differs from the completely open evaporator 200 illustrated in FIG. 2. A processor responding to sensors and programming to produce the best water production as a function of energy efficiency can automatically control the chilling potential of the downstream panel may be provided.

Figure 4:
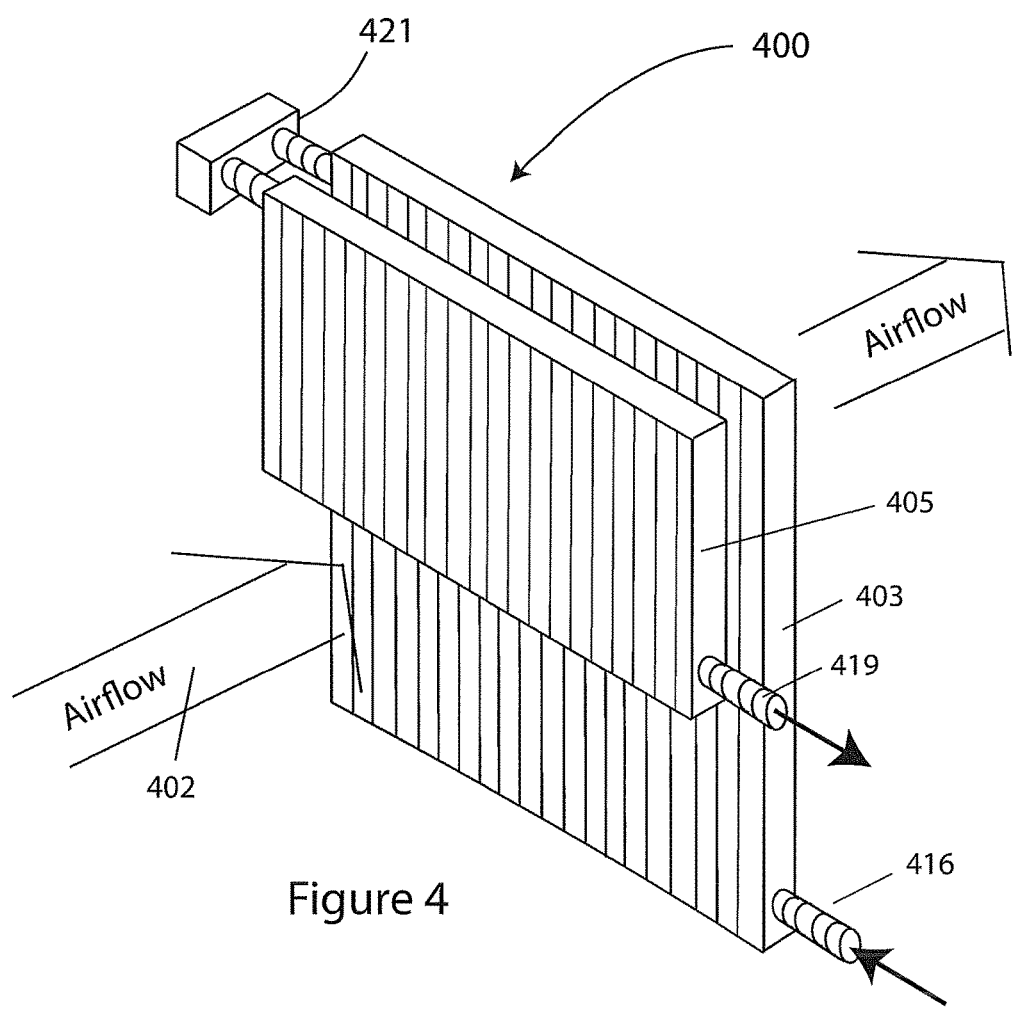
FIG. 4 is a perspective view of an evaporator having heat exchange section panels of unequal major cross-section in accordance with an embodiment of the present invention.

With reference now to FIG. 4, there is illustrated a diagrammatic perspective of an evaporator embodiment 400 that is similar to evaporator 300 that is shown in FIG. 3 with the exception of the upstream panel 405 and downstream panel 403 are of different size. Specifically, upstream panel 405 is smaller than downstream panel 403 which has the effect of reduced pre-cooling on airflow 402. In the representatively illustrated embodiment, upstream panel 405 has a vertical length that is about half of the vertical length of the downstream panel 403, and a horizontal length this about the same. Evaporator 400 is not limited to this arrangement, and relative dimensions between the upstream panel 405 and the downstream panel 403 may be configured as desired based upon required pre-cooling. Inlet 416, outlet 419, and valve 421 are similarly placed to those shown in FIG. 3. This embodiment can be used when little pre-cooling load is anticipated and in which the capital cost of the parts and fabrication are justified by a cost-efficient trade-off is lowered energy cost.

Figure 5:
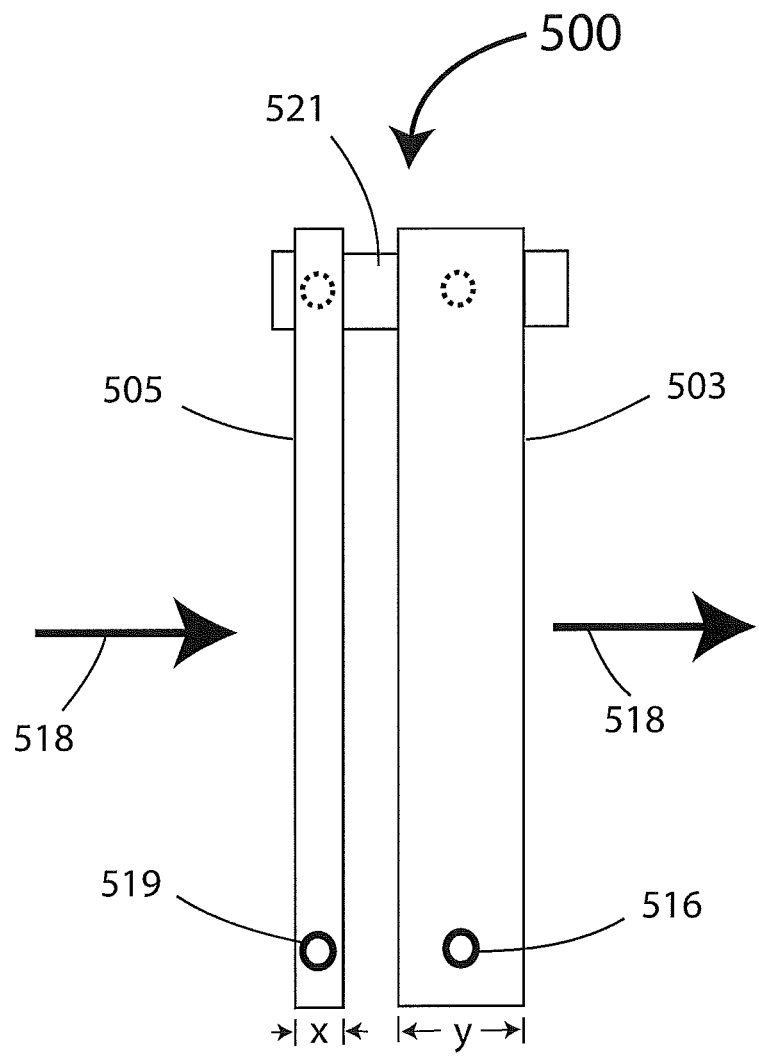
FIG. 5 is a side elevation view of an evaporator having heat exchange section panels of unequal thickness in accordance with an embodiment of the present invention.

With reference now to FIG. 5, there is illustrated a diagrammatic side elevation of an evaporator embodiment 500 that is similar to evaporator 300 that is shown in FIG. 3 with the exception of the upstream panel 505 and downstream panel 503 are of different thickness. Specifically, upstream panel 505 has a thickness x that is less than the thickness y of downstream panel 503. Reducing thickness of upstream panel 505 relative to the downstream panel 503 lowers the refrigeration or cooling capacity of the upstream panel 505 relative to the downstream panel 503, and thus provides a reduce pre-cooling of air 518.

The construction of evaporator 500 differs from that of evaporator 400 by causing air incident upon the upstream panel 503 to be first be entirely incident upon the downstream panel 505. Whereas in evaporator 400, a first portion of air incident upon the upstream panel 403 was first caused to be incident upon the downstream panel 405, and a second portion of air incident upon the upstream panel 403 was not caused to be incident upon the downstream panel 405.

Inlet 516, outlet 519, and valve 521 are similarly placed to those shown in FIG. 3. Similarly, this embodiment can be used when little pre-cooling load is anticipated and in which the capital cost of the parts and fabrication are justified by a cost-efficient trade-off is lowered energy cost.

The most energy efficient water harvesters are controlled by a computer responding to ambient lookup tables of diurnal and temperature and humidity and a thermodynamic model to fine-tune operation for changing existing conditions. Sensors (not shown) allow the controller to achieve the greatest energy efficiency. Both the chilling potential of the evaporator, which can be controlled by changing the rate at which refrigerant fluid is injected and the gas removed from the evaporator or by restricting the flow from the upstream panel to the downstream, and also varying the airflow, can strongly effect electricity consumption as a function of water production. In addition to controlling the overall and panel chilling potentials, the airflow impeller/fan and the compressor may be capable of variable speed operation. The controls adjust the operation of the variables so as to achieve optimal performance for any combination of ambient air temperature and RH.

Sealed electronic controls and computer systems that control the refrigeration and airflow system are similar to most refrigeration equipment. In order to prevent overheating of the electronic control pad, it may be directly exposed to cold airflow. Alternatively, a heat exchanger between cold airflow or ambient air or cold produced water could provide the cooling for the electronic control system so that it would not overheat. Thus, heat that may be produced within the pad or by heating of the pad externally by heat exchange with ambient air or heating by the sun may be removed and the pad kept within operating temperature conditions. In normal operation the control pad may be shielded from the sun. A control panel may also be capable of communication to a remote controller or to other commands from other systems such as water level switches that can stop and start the apparatus.

It can be understood, the present invention improves on an evaporator heat exchanger designed for producing water from air and, to our knowledge, other energy saving apparatus and methods that have been proposed or used in achieving greater energy efficiency from a single direct airflow and a single evaporator panel in that airflow. The invention simplifies other processes proposed for pre-cooling, multiple air paths, and/or multiple heat exchanger apparatus to achieve better control of the temperature of air within an atmospheric water harvester. In addition, some attributes of other pre-cooling systems' energy efficiencies are captured, which enhances overall energy efficiency per unit of water produced. Further, use of the invention may reduce the number of parts and manufacturing cost.

Figure 6:
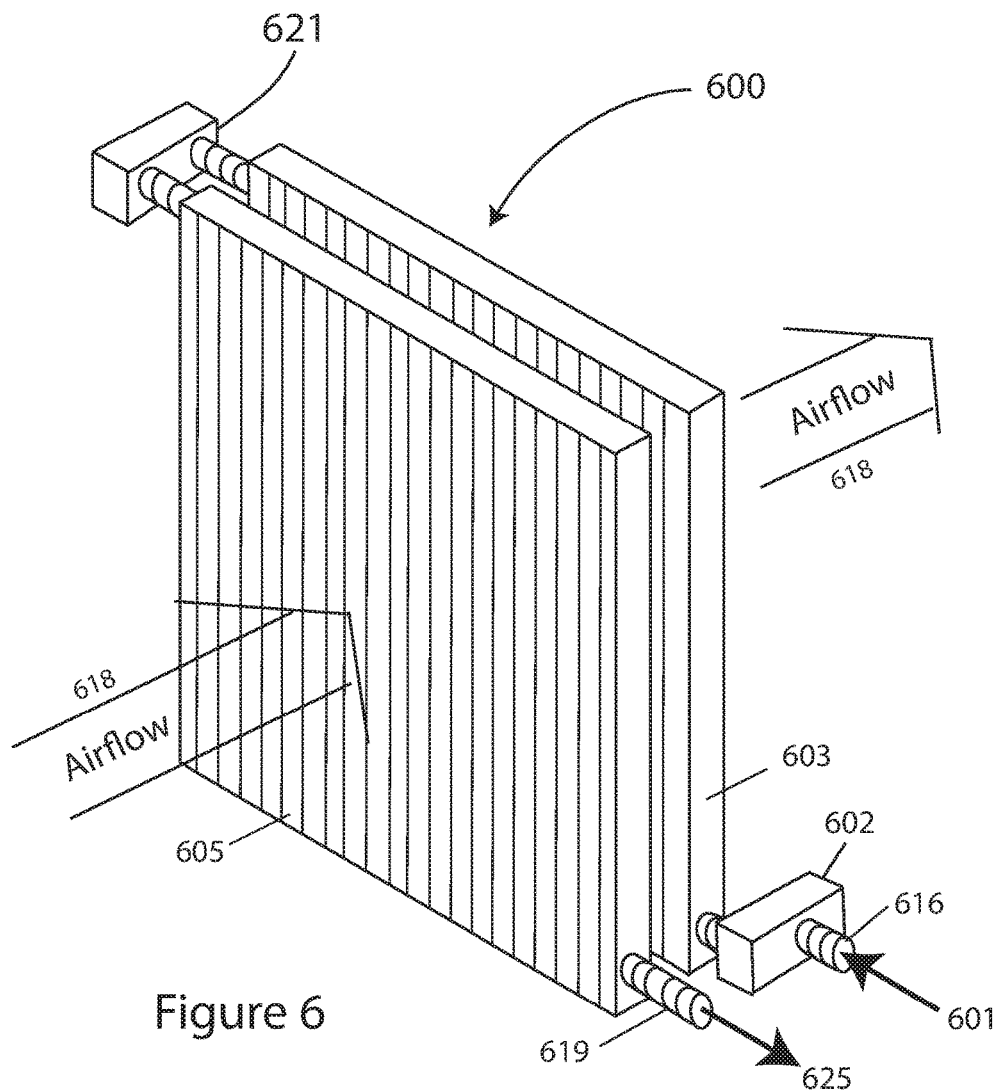
FIG. 6 is a perspective view of an evaporator having heat exchange section panels of equal major cross-section in accordance with an embodiment of the present invention having flow control valves on the inlet and between heat exchange panels.

Turning now to FIG. 6, which is illustrated a diagrammatic perspective view of an evaporator 605 constructed in accordance with the principals of the present invention, and embodied as evaporator 115 in the harvester 110 illustrated in FIG. 1 and discussed previously. Evaporator 600 includes multiple interconnected heat exchange panels 603 and 605 in a cascading flow in which refrigerant vapor passes through two or more panels that are arranged with their major cross-sectional areas parallel and in-line with the direction the airflow 618 such that the airflow passes through each panel without deviating from a net airflow direction. Panels 603 and 605 are spaced from each other in the direction of airflow 618. For the purpose of discussion herein, upstream and downstream refrigerant flow relates to the direction of refrigerant flow through the evaporator 600. And upstream and downstream air flow relates to the direction of air flow through the evaporator 600.

Only two evaporator panels 603 and 605 are shown for the purpose of simplicity, but more than two could be used. Refrigerant 601 flow into the compound evaporator 600 begins by entering panel 603 from refrigerant tube section 616, flowing through a variable vaporization flow valve 602 capable of metering refrigerant flow into panel 603. The vapor exits the upstream panel 603 through refrigerant tubes and a second variable flow valve 621 that is also capable of metering refrigerant flow into panel 605. The refrigerant vapor exists from the upstream panel 619, which is connected by a non-return valve (not shown) to a compressor 625 that pressurizes the refrigerant to a liquid that is reinjected after passing through a heat exchanger that removes heat (FIG. 1).

According to the combined gas law (Charle's, Boyle's, and Gay-Lussac's laws) that each relate one thermodynamic variable to another while other variable constants, there is a direct mathematical relationship between temperature and pressure of a constant volume of gas. In other words, inside of a vessel of a certain volume, for instance each of the heat exchangers in the invention, as pressure increases the temperature rises and as the pressure drops, the temperature falls. The invention implements additional chilling effect by selectively reducing pressure and temperature. The invention controls the timing and location of the additional chilling by introducing cycling, which could be considered as a type of batch refrigeration process that can be cycled indefinitely. Internal sensors provide control operation so that the pressure in either the upstream or the downstream panel may be lowered to best fit the thermodynamic model for system performance. This mode of operation is in strong contrast to the operation of a conventional vapor compression refrigeration system.

The purpose of the control valves 602 and 621 are to control the flow into and between the panels such that the compressor can be used to lower pressure of the refrigerant vapor below that which would ordinarily exist within a vapor compression refrigeration system. The invention can be operated in a cyclic fashion such that each evaporator panel can be isolated and the two evaporator panels can be maintained at different pressure. By controlling the rate and periodicity of injection and compressor extraction for refrigerant, pressures within each panel can be lowered such as to create an additional chilling potential.

In one embodiment, the upstream control valve 602 meters vaporization to meet system energy efficiency parameters according to a thermodynamic model for greatest condensation efficiency at the desired temperature range, and the interpanel control valve 621 also meters the chilled vapor from the upstream panel to the downstream panel such that the full value of latent heat consumption for condensation is achieved before the vapor passes to the downstream panel.

In another embodiment, especially where greater removal of sensible heat from air by the downstream panel 605 is desired, the interpanel valve 621 is essentially closed so that the compressor acts to lower pressure within the downstream panel, which initiates a further chilling demand according to the combined gas law. The period of valve closure is determined by the time over which the desired chilling potential can be maintained usefully. The run-time of the compressor 625 will vary as to its requirement to maintain desired conditions according to the thermodynamic model.

In another embodiment, at the close of the desired low pressure/low temperature period in the downstream panel, the interpanel valve 621 to the upstream panel 605 is opened or severely restricted such that chilled vapor again flows from the upstream panel 602 to the downstream panel. The compressor 625 continues to remove refrigerant vapor such that the pressure in both panels drops, which initiates a further chilling demand in both panels. Following extracting the desired amount of heat from both panels, the inlet injector valve 602 is opened to its desired setting and the chilling potential of the system is increased. A complete cycle of pressure drop accentuated refrigeration begins with each opening of the inlet valve 602

In a preferred embodiment, both the rate of refrigerant injection into and between panels is controlled along with compressor assisted increased chilling potential cycling to optimize energy consumption as a function of water production.

It can be understood, that although the invention is superficially similar to conventional refrigeration units, it apportions the sensible and latent heat potential in the system so as to increase energy efficiency for any specific volume of water produced by condensation of water from air, the methodology of the invention is actually significantly different because the function is different. The compound evaporator can be operated in a distinctively different manner than the essentially continuous evaporation required for refrigeration and air conditioning. For instance, the requirement for energy efficient water condensation is that both precooling (if any) and condensation will take place on an evaporator that must maintain a temperature range determined by the thermodynamic model for intake air and internal operating conditions. This results in the chilling potential being less overall than for a conventional refrigeration plant.

Operation of the invention in this unique way is possible because pressure and temperature can be controlled. Also, the advantages of being able to control the pressure in each of the heat exchangers in order to optimize water condensation as a function of energy consumption is significantly different from the operation of a conventional vapor compression refrigeration so that this invention is not likely to be apparent to a person skilled in the conventional art.

In a conventional vapor compression refrigeration system, vaporization upon injection into the vaporizer heat exchanger and removal of the vapor from the heat exchanger are essentially constant, especially when a maximum chilling effect is intended on a relatively large volume of air passing through the heat exchanger. In this invention, airflow is maintained at a high rate with energy efficiency because fans or inductors use relatively little energy. Energy efficiency as a function of water volume produced is obtained by operating the invention so that a particular volume of water is produced for a minimum run-time of the system compressor (FIG. 1), which uses most of the electrical energy in a vapor compression water production system.

The principles of only removing a relatively small amount of water from each volume of moist air passing through the invention while operating the heat exchanger at a relatively low thermal demand in order to minimize compressor run-time has been discussed earlier. The principles of using what is essentially waste chilling potential to lower sensible heat of the airflow in the downstream panel before it reaches the upstream panel has also been discussed. In order to better control temperature in each panel to achieve maximum energy efficiency, the invention is capable of fully partitioning the panels so that different pressures can be maintained. Cycling pressures within the panels can achieve greater or improved chilling effect from a particular volume of liquid refrigerant.

A number of embodiments of the present invention have been described. Nevertheless, it will be understood that various modifications may be made without departing from the spirit and scope of the invention. Accordingly, other embodiments are within the scope of the following claims.

What is claimed is:

1. An air-cooling system, comprising:
   an airflow conduit extending from an air intake to an air exhaust, with the air-cooling system being configured to propel air from the air intake to the air exhaust; and
   a vapor-compression refrigeration circuit, including an evaporator disposed within the airflow conduit and having flowing refrigerant circulating within the vapor-compression refrigeration circuit,
   wherein the evaporator comprises a pair of heat exchange panels arranged essentially parallel to each other with respective major surfaces thereof arranged about normal to a direction of airflow within the airflow conduit at the location of the evaporator, with 1) one of the heat exchange panels being a windward heat exchange panel that the air encounters first as the air flows from the air intake to the air exhaust, and 2) the other heat exchange panel being a leeward heat exchange panel that the air encounters second as the air flows from the air intake to the air exhaust; and
   wherein the refrigeration circuit is arranged such that the refrigerant flows into the leeward heat exchange panel; from the leeward heat exchange panel to the windward heat exchange panel; and out of the windward heat exchange panel as the refrigerant flows within the vapor-compression refrigeration circuit.

2. The air-cooling system of claim 1, wherein the airflow conduit extends in a single direction, such that the air flows across the windward heat exchange panel and then the leeward heat exchange panel without changing direction.

3. The air-cooling system of claim 1, further comprising a variable-vaporization flow valve arranged upstream of the leeward heat exchange panel with respect to a direction of flow of the refrigerant within the refrigeration circuit, the variable-vaporization flow valve being configured to meter the flow of the refrigerant into the leeward heat exchange panel.

4. The air-cooling system of claim 1, further comprising a variable-vaporization flow valve arranged downstream of the leeward heat exchange panel and upstream of the windward heat exchange panel with respect to a direction of flow of the refrigerant within the refrigeration circuit, the variable-vaporization flow valve being configured to meter the flow of the refrigerant into the windward heat exchange panel.

5. The air cooling system of claim 1, further comprising a first variable-vaporization flow valve arranged upstream of the leeward heat exchange panel with respect to a direction of flow of the refrigerant within the refrigeration circuit, the first variable-vaporization flow valve being configured to meter the flow of the refrigerant into the leeward heat exchange panel; and a second variable-vaporization flow valve arranged downstream of the leeward heat exchange panel and upstream of the windward heat exchange panel with respect to a direction of flow of the refrigerant within the refrigeration circuit, the second variable-vaporization flow valve being configured to meter the flow of the refrigerant into the windward heat exchange panel.

6. A method for causing moisture to condense from air, comprising:

causing moisture-laden air to flow across a multi-panel evaporator having a windward heat exchange panel and a leeward heat exchange panel; and flowing refrigerant into the leeward heat exchange panel; from the leeward heat exchange panel into the windward heat exchange panel; and out of the windward heat exchange panel, with the refrigerant vaporizing within the evaporator to remove heat from the moisture-laden air;

wherein the flow of the refrigerant through the leeward heat exchange panel and the windward heat exchange panel is regulated such that sensible heat is removed from the moisture-laden air by the windward heat exchange panel and latent heat of water vaporization is removed from the moisture-laden air by the leeward heat exchange panel, whereby the windward heat exchange panel precools the moisture-laden air and the leeward heat exchange panel causes moisture to condense from the moisture-laden air.

7. The method of claim 6, wherein the moisture-laden air is caused to flow across the multi-panel evaporator in a single pass.

8. The method of claim 7, wherein the moisture-laden air is caused to flow across the multi-panel evaporator without changing direction.

9. The method of claim 6, wherein vapor pressure within the windward heat exchange panel and vapor pressure within the leeward heat exchange panel are caused to differ from each other.

10. The method of claim 9, wherein the windward heat exchange panel and the leeward heat exchange panel are periodically isolated from each other.

11. The method of claim 10, wherein refrigerant is removed from the windward panel by a refrigerant compressor while the windward heat exchange panel and the leeward heat exchange panel are isolated from each other so as to lower vapor pressure within the windward heat exchange panel.

\* \* \* \* \*